United States Patent [19]

Schartmann et al.

[11] 3,748,403

[45] July 24, 1973

[54] LINE CIRCUIT FOR A KEY TELEPHONE SYSTEM

[75] Inventors: Knut Roger Schartmann, Montreal; Wesley John Warner, Ottawa, Ontario, both of Canada

[73] Assignee: Northern Electric Company Limited, Montreal, Quebec, Canada

[22] Filed: Dec. 15, 1971

[21] Appl. No.: 208,251

[52] U.S. Cl. .................................................. 179/99
[51] Int. Cl. .................................................. H04m 3/22
[58] Field of Search .................................................. 179/99

[56] References Cited

UNITED STATES PATENTS 3,676,608 7/1972 Goldthorp et al. .................. 179/99
3,436,488 4/1969 Barbato et al. .................. 179/99

*Primary Examiner*—Kathleen H. Claffy
*Assistant Examiner*—Kenneth D. Baugh
*Attorney*—John E. Mowle

[57] ABSTRACT

A line circuit for a key telephone system having a common timing circuit which utilizes a single capacitor and a plurality of resistors to derive the various time constants required during the four operating states (idle, ringing, busy and hold) of the system. Contacts, associated with standard control relays used in the line circuit, are utilized to control connections to the resistors to obtain the desired time constants.

1 Claim, 1 Drawing Figure

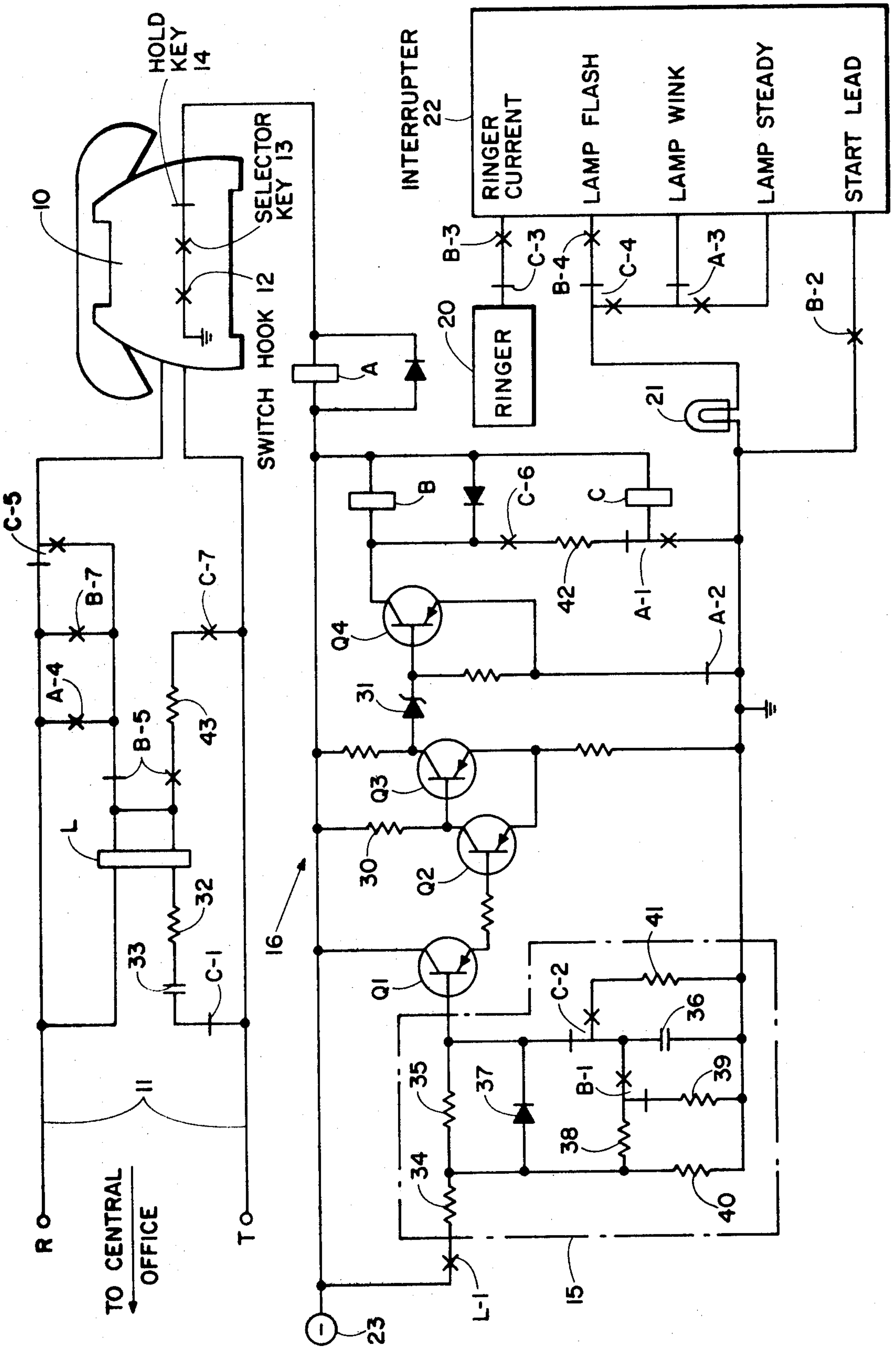
INTERRUPTER 22
RINGER CURRENT
LAMP FLASH
LAMP WINK
LAMP STEADY
START LEAD
RINGER
HOLD KEY 14
SELECTOR KEY 13
SWITCH HOOK 12
TO CENTRAL OFFICE
R
T

LINE CIRCUIT FOR A KEY TELEPHONE SYSTEM

FIELD OF THE INVENTION

This invention relates to a key telephone system and, more particularly, to an improved line circuit for such a system.

DESCRIPTION OF THE PRIOR ART

Key telephone systems are commonly used throughout the telephone industry where it is desired to connect one or more telephones to a plurality of telephone lines without the necessity of providing an operator to perform the interconnections. A typical key telephone system has up to four or five lines each connected to a number of telephones. Access to any one of the lines is obtained by depressing a selector key for that particular line. In addition, a hold key is provided whereby a selected line may be placed in a hold position so that the telephone handset may be returned to an on-hook position or connected to another telephone line.

In general, four operating states exist, namely: idle, ringing, busy or hold. Each of these states may be identified on the telephone set using a system of signalling lamps. Thus, the idle state for a particular line is indicated when the lamp is off; the ringing state when the lamp is flashing at one rate; the busy state when the lamp is lit continuously; and, the hold state when the lamp is flashing at a second rate. Prime requirements for such a key telephone system are high reliability and low cost with the circuitry meeting specific operating parameters. Each key telephone system is controlled by a line circuit which thus forms the heart of the system. It is evident, therefore, that the line circuit itself must be reliable, be able to work under various operating conditions and be economical to construct and operate.

In the past, various line circuits have been proposed for controlling the key telephone systems. One such line circuit is described in Canadian Pat. No. 763,518 issued July 18, 1967 and invented by Charles E. Morris and John P. Smith. This circuit utilizes common transistors to actuate control relays which, in turn, condition the telephone set to indicate the various operating modes. In order to place or maintain the telephone set in a selected operating condition, a number of timing circuits have been used to prevent the line circuit from reacting to false signals on the line or to short interruptions in the power supplied to the system. In the past, this has been obtained by utilizing a number of resistance-capacitance (RC) integration networks which provide the various timing modes which are utilized during the various operating states. The use of several relatively large capacitors in these networks is undesirable from an economic and reliability standpoint. Hence, it is desirable to reduce the number while still providing all of the various timing modes.

SUMMARY OF THE INVENTION

It has been discovered that a common timing circuit, utilizing a single capacitor, can be obtained by controlling the time constant of an RC network from contacts on the control relays which are used to condition the telephone set in its various operating states.

Thus, the present invention provides an improved line circuit for a key telephone system which includes a telephone line and a telephone set. The line circuit comprises a common timing network which includes a capacitor and a plurality of resistors for providing the various timing modes. The circuit also includes a line relay which is responsive to signals on the telephone line for controlling the charging of the timing network. A trigger circuit responsive to the output of the common timing network and the actuation of off-hook, on-hook and a hold key in the telephone set are used to operate a pair of control relays in various configurations to indicate idle, ringing, busy and hold states in the set. These control relays, in turn, include contacts for altering connections to the resistors in the timing network so as to provide the various timing modes. The use of only a single capacitor in the timing circuit to provide the various timing modes reduces the number of components and hence improves reliability and cost. Additionally, a reduction in the number of capacitors favours integration of the circuitry, to enable cost saving hybrid circuit techniques to be used in constructing the invention.

In a specific embodiment of the invention the timing circuit is arranged so that the capacitor is discharged during the idle and off-hook states of the telephone set. This prevents false indication of the state of the set when power is restored immediately after a power interruption.

BRIEF DESCRIPTION OF THE DRAWING

An example embodiment of the invention will now be described with reference to the single FIGURE of drawings which illustrates a line circuit for a key telephone system.

DESCRIPTION OF THE PREFERRED EMBODIMENT

In the single FIGURE, a subscribers telephone handset 10, which is representative of one of a plurality in a key telephone system, is shown connected to the T and R leads of a telephone line 11. The telephone line 11 would in turn be connected to a central office (CO) or, as an alternative, to a private branch exchange (PBX). The handset 10 includes make contacts actuated by a switch hook 12, make contacts actuated by a line selector key 13 and break contacts actuated by a hold key 14. The basic elements of the line circuit include a line relay L, three control relays A, B and C, a timing circuit 15 and a trigger circuit 16 which include transistors Q1, Q2, Q3 and Q4. As will become apparent from the following description, various contacts of the relays A, B, C and L (identified by an associated number) are utilized to control power to the timing circuit 15, the trigger circuit 16 and to actuate the local signalling devices such as a ringer 20 and the station lamp 21 from an interrupter 22 all of which are supplied by a negative d-c power supply 23. The detailed structure of the line circuit will become readily apparent from the following circuit description of its function and operation during the four basic operating states: idle, ringing, busy and hold.

IDLE STATE

When the line circuit is in an idle state, neither the line relay L nor the control relays A, B or C are operated. With no signals on the telephone line 11, make contacts L-1 of the line relay L remain unactuated. Thus, no voltage from the negative d-c power supply 23 is connected to the input of the timing circuit 15. Consequently, both transistors Q1 and Q2 are cut off. The transistor Q3 is held in a conducting state by base current supplied through a resistor 30. The collector of the transistor Q3 is coupled to the base of the transistor Q4 through a zener diode 31. During this period, the latter is held in a nonconducting state because the voltage across it is below the zener or breakdown voltage. Consequently, the transistor Q4 is cut off. With all three relays A, B and C in an unactuated position, no signal currents from the interrupter 22 are connected to either the ringer 20 or the station lamp 21.

RINGING STATE

When a-c ringing signals are received from the central office on the T and R leads of the telephone line 11, a ringing current flows from the R lead through the line relay L, a resistor 32, a capacitor 33 and break contacts C-1 to the T lead causing the line relay L to operate on each half cycle. Operation of the line relay L in response to the ringing current causes its make contacts L-1 to pulse at twice the ringing frequency. Consequently, voltage from the negative d-c power supply 23 is coupled through resistors 34 and 35 and the break portion of transfer contacts C-2 to commence charging a capacitor 36. When the contacts L-1 break, the capacitor 36 will start to discharge through a diode 37, a resistor 38, the break portion of transfer contacts B-1 and a resistor 39. A resistor 40, which is in parallel with the resistors 38 and 39, has a negligible effect during this period due to its relatively high resistance. If a true ringing signal is received on the telephone line 11, the line relay L will pulse with its operated time much longer than the release time and the capacitor 36 will charge to a potential which depends on the duty cycle of the line relay L. As the voltage across the capacitor 36 increases, the transistors Q1 and Q2 will turn on causing the transistor Q3 to turn off due to the Schmitt trigger action of the latter two. Consequently, the voltage at the collector of the transistor Q3 will rise towards the supply voltage and the zener diode 31 will start to conduct to turn on the transistor Q4. This, in turn, causes the relay B to operate which, in turn, closes the make contacts B-2 thereby connecting ground to a start lead in the interrupter 22. Typically, this occurs after a time delay of about 300 milliseconds following receipt of the ringing signals. In addition, local ringing current from the interrupter 22 is connected through the make contacts B-3 and the break contacts C-3 to the ringer 20. Also, lamp flashing current is connected through the make contacts B-4 and the break portion of transfer contacts C-4 to the station lamp 21 causing it to flash at the ringing rate.

The transistors Q2 and Q3 are connected as a conventional Schmitt trigger with a large hysteresis to insure that any ripple from the d-c supply 23 will not affect the circuit operation.

The actuation of the transfer contacts B-1 causes the majority of the current from the d-c supply 23 to flow through the smaller valued resistors 34 and 38 so that the capacitor 36 rapidly charges to substantially the supply voltage. During this period, the time constant of the discharge path of the capacitor 36 through the diode 37 and the resistor 40 is selected so that the transistor Q1 will continue to conduct during intervals when the line relay L is not conducting during breaks in the ringing signal on the telephone line. If the call is abandoned and the ringing current from the central office on the telephone line 11 ceases, the relay L will stop pulsing and the capacitor 36 will discharge through the diode 37 and the resistor 40. As the capacitor 36 discharges, the transistors Q1 and Q2 will turn off causing transistor Q3 to turn on so as to cut off the conduction of the zener diode 31. This, in turn, causes the transistor Q4 to stop conducting which releases the control relay B and the circuit returns to the idle state.

BUSY STATE

If the telephone set 10 goes off-hook in response to an incoming call or at the commencement of an outgoing call, ground is applied through the switch hook 12, the depressed selector key 13 and the hold key 14 to operate the relay A from the d-c supply 23. Operation of the relay A causes transfer contacts A-1 to actuate thereby operating relay C by connecting it between ground and the d-c supply 23. In addition, break contacts A-2 actuate, disconnecting transistor Q4 thereby releasing relay B if it is operated at this time. Operation of the relays A and C cause the transfer contacts A-3 and C-4 to actuate so as to connect the lamp steady current to the station lamp 21. In addition, the break contacts C-3 open thereby disconnecting the ringer current from the ringer 20. Actuation of the transfer contacts C-2 also causes the capacitor 36 to discharge through a resistor 41. At the same time, actuation of transfer contacts C-5 and make contacts A-4 maintains a metallic path along the R lead from the central office to the telephone set 10.

HOLD STATE

When the telephone set 10 is off-hook, actuation of the hold key 14 releases relay A. Line current from the central office on the R lead will now flow through the line relay L, the break portion of transfer contacts B-5 and the make portion of transfer contacts C-5 to operate the line relay L. This, in turn, actuates the make contacts L-1 which connects the d-c voltage supply 23 through the resistors 34 and 35 to the base of the transistor Q1. The capacitor 36 does not charge at this time because the relay C is still operated and consequently transistors Q1 and Q2 turn on immediately. Due to the Schmitt trigger action the transistor Q3 turns off and holds the relay C operated through the transistor Q4, make contacts C-6, a resistor 42 and the break portion of transfer contacts A-1. About 20 milliseconds later, the relay B will also operate causing transfer contacts B-5 to actuate thereby switching the holding current for relay L through a resistor 43 and make contacts C-7. With both relays B and C operated, a metallic path is maintained along the R lead through make contacts B-7 and C-5. This maintains the T and R leads balanced during the hold state. The operation of the relay B starts the interrupter 22 by grounding the start lead through the make contacts B-2. Concurrently, lamp wink current from the interrupter 22 is connected through the break portion of transfer contacts A-3 and the make portion of transfer contacts C-4 to the station lamp 21. The capacitor 36 will now rapidly charge through the make contacts L-1, resistors 34 and 38 and the make contacts B-1.

If the line current on the telephone line 11 is interrupted by the distant party going on-hook, the line relay L will release and the capacitor 36 will again discharge through the resistor 41 to release the hold after a short delay. This latter delay is required to momentarily bridge openings on the T and R leads of the telephone line 11 that occur during switching in the central office.

POWER FAILURE STATE

During a local power failure of the d-c supply 23, a metallic path between the telephone set 10 and the telephone line 11 is provided via the break portion of transfer contacts C-5. Outgoing calls may be placed and incoming calls may be received but all lamps and signals will be inoperative.

As is apparent from the foregoing, the various time constants are obtained using a single capacitor and a plurality of resistors which are switched in and out by the control relays. By minimizing the number of capacitors, the present circuit provides reliable operation at reduced cost. The single capacitor 36 in the timing circuit 15 is maintained in a discharged condition except during the ringing and hold states. Consequently, the circuit is much less susceptible to false signalling indications which are often experienced in prior art circuits that normally maintain the timing capacitors in a charged state during the idle state of the telephone handset 10. This latter condition can result in false ringing after a sudden drop in the supply voltage or a short duration power failure.

The trigger voltage of transistors Q1 and Q2, is basically determined by the voltage on the emitter of the transistor Q3. If the voltage from the power supply 23 decreases, the trigger voltage will also decrease. The capacitor 36 would then charge towards a lower supply voltage and the time taken to reach the trigger voltage would also increase if the latter were fixed. However, the trigger voltage has also decreased and hence the time delay remains relatively constant.

What is claimed is:

1. A line control circuit, for a key telephone system including a telephone line and a telephone set, comprising:

a timing network including a single capacitor and a plurality of resistors for providing a plurality of time-delay intervals;

a trigger circuit responsive to delayed trigger signals from said timing network;

a line relay responsive to ringing signals and direct current signals on the telephone line, for actuating contacts to apply a supply voltage to the timing network so as to charge the single capacitor through at least one of said resistors and provide a delayed trigger signal after a time-delay interval;

a first control relay responsive to an off-hook condition of the telephone set including contacts for disabling the output of the trigger circuit;

a second control relay responsive to the trigger circuit for indicating a ringing state of said telephone set and including connections to the resistors to rapidly charge said single capacitor so as to substantially decrease said time-delay interval and thereby sustain a continuous ringing condition in said telephone set;

a third control relay responsive to actuation of the first relay for indicating a busy state of said telephone set and to alter connections to the resistors to discharge the single capacitor in the timing network, said third control relay including self-holding contacts for holding itself actuated via the trigger circuit;

a hold key for releasing the first control relay during said off-hook condition and actuating the second and third control relays to indicate a hold state of said telephone set;

and including means wherein the single capacitor is discharged during the idle and off-hook states of the telephone set, thereby substantially preventing false indication of conditions in said set immediately following a power disruption thereto.

* * * * *